Sept. 28, 1943. R. H. JUDSON 2,330,368
ANTI-NOISE BRAKE STRUCTURE
Filed April 10, 1941
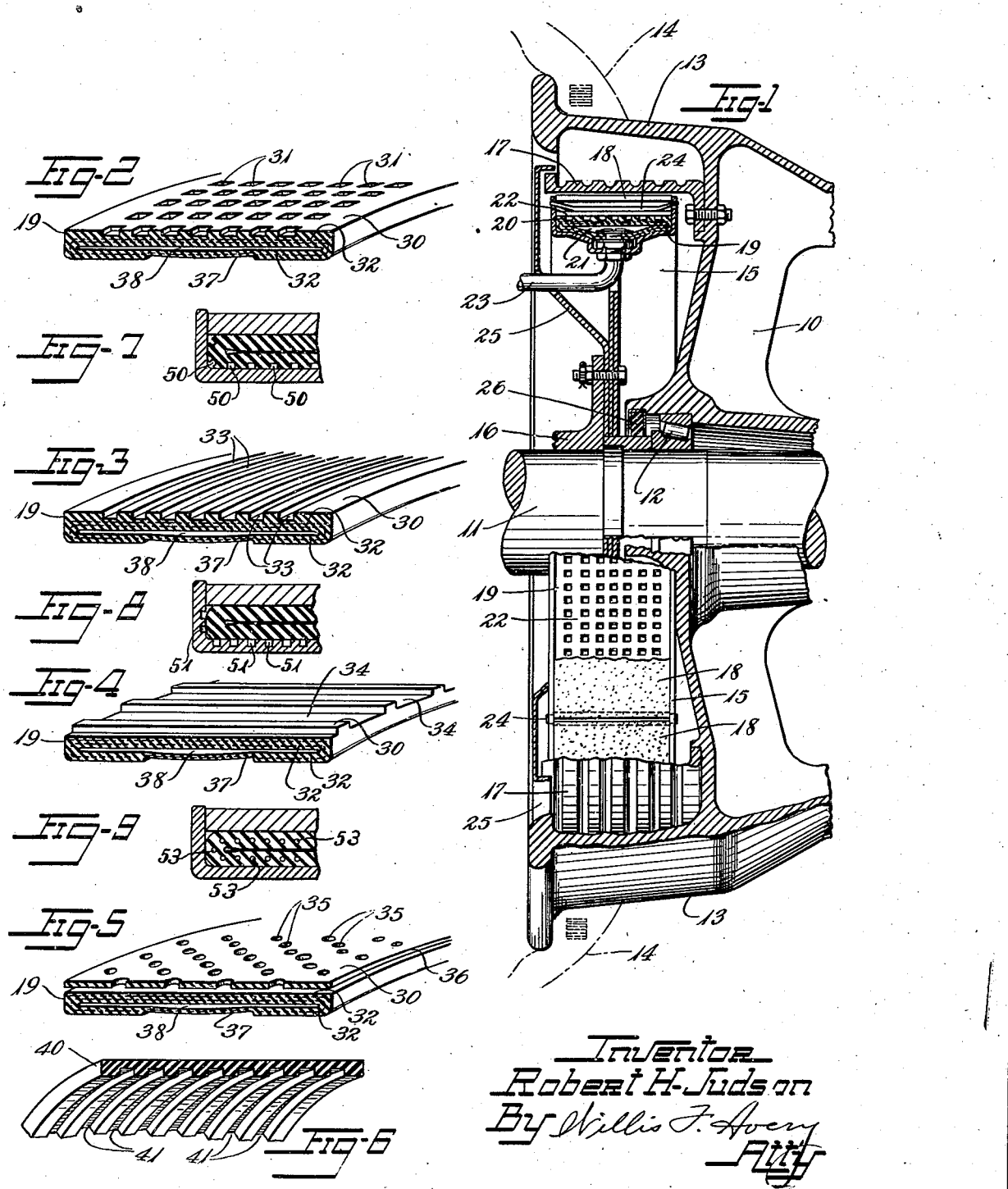
Inventor
Robert H. Judson
By Willis F. Avery
Atty Patented Sept. 28, 1943

2,330,368

UNITED STATES PATENT OFFICE 2,330,368

ANTINOISE BRAKE STRUCTURE

Robert H. Judson, Akron, Ohio, assignor to The B. F. Goodrich Company, New York, N. Y., a corporation of New York Application April 10, 1941, Serial No. 387,897

6 Claims. (Cl. 188—152)

This invention relates to brakes, clutches, etc., including brakes of the fluid pressure type for use in the wheels of aircraft, and especially to the avoidance of noise in the operation thereof.

Heretofore, airplane brakes of the expansible tube type have sometimes presented the objectionable feature of excessive squealing or squeaking during the braking period, particularly when a high rate of deceleration has been necessary, as is often the case in landing an airplane. While the vibrating forces which cause the noise are generated at the sliding surfaces of the brake blocks and drum, the nature of the noise apparently is dependent upon conditions existing in the assembly of the related parts. Undesirable noise has also been encountered in brakes and clutches of other than the expansible tube type and when used in machines and vehicles other than aircraft.

The chief objects of the present invention are to provide for reduction or elimination of objectionable squeal or other noise in mechanisms of the type wherein a member is pressed into frictional engagement with a relatively rotatable member by an expansible element; to provide a brake substantially free from objectionable squealing in service while retaining braking efficiency and structural strength in the brake, and to provide a brake of the expander tube type for airplane wheels that in operation is substantially free from objectionable sound.

Other objects are to provide for improved ventilation in brakes; to provide for reduction or elimination of the effects of swelling; to provide for light weight and structural strength, and to provide for efficiency and convenience of operation and economy of manufacture.

These and further objects will be apparent from the following description, reference being had to the accompanying drawing in which:

Fig. 1 is a cross-sectional elevation of a portion of an airplane wheel and brake assembly, parts being broken away.

Fig. 2 is a perspective view on an enlarged scale of a portion of an expander tube constructed in accordance with and embodying the invention.

Fig. 3 is a view like Fig. 2 but showing a modified form of expander tube.

Fig. 4 is a view like Fig. 2 but showing a further modified form of expander tube.

Fig. 5 is a view like Fig. 2 but showing a still further modified form of expander tube.

Fig. 6 is a perspective view of a portion of a brake block.

Figs. 7, 8 and 9 are fragmentary cross-sectional views showing further modified constructions.

The invention may be incorporated in a brake of the expander tube type as shown in Fig. 1 of the drawing, suitable for airplane use. The brake assembly may include a wheel assembly comprising a wheel 10 rotatably mounted on a torque shaft 11 by means of an anti-friction bearing 12. The wheel 10 includes a rim portion 13 adapted to receive a tire as indicated at 14. A torque frame 15 is bolted or otherwise suitably fastened to a torque flange 16 which is fixed to the torque shaft 11.

A brake drum 17 may be bolted to the wheel 10 as shown or otherwise secured with respect thereto in a manner to be rotatable therewith and preferably presents a substantially cylindrical surface to be contacted by a suitable braking surface, preferably the surfaces of a series of brake blocks 18, 18 of heat-resistant composition, as incorporated in the construction shown in the drawing, and mounted in the torque frame 15. The annular contacting surface between the drum 17 and the blocks 18, 18 is preferably cylindrical although other forms are not excluded.

An expansible tube 19 is adapted to be mounted in the torque frame 15 underneath the blocks 18, 18 and comprises an annular body portion 20 of flexible material, a continuous fluid-receiving passage 21 enclosed and sealed by the body portion, and a discontinuous surface 22 adapted to contact the brake blocks 18, 18 when the tube 19 is expanded by pressure-fluid admitted through a fluid conducting tube 23 to the fluid receiving passage 21. The discontinuous, brake block contacting surface 22 of the expander tube 19 and its functions are more fully described hereinafter.

Leaf springs 24, 24 may be disposed between the brake blocks 18, 18 in channels in the ends of the same and held in suitable slots provided in the torque frame 15 and are desirable to ensure retraction of the blocks 18, 18 from contact with the drum 17 when the tube 19 is deflated, and to prevent rotation of the same. A continuous shield 25 may be provided to prevent the entrance of dirt, grease, etc., into contact with the braking mechanism and may be bolted to the torque flange 16 as shown. A grease-retaining washer 26 or other suitable sealing member may be provided between the wheel 10 and the torque shaft 11.

In the attainment of the objects hereinbefore stated, I have found that by suitably reducing the stiffness of a portion of the expander tube or other part of the structure supporting the brake blocks, a braking mechanism may be provided which produces substantially no objectionable squealing effect when the brakes are applied in service.

The proper increase in the yieldability of the expander tube results in a reduction or elimination of squealing, apparently, at least in part, from the fact that since resonant frequency is dependent upon stiffness of medium, a suitable reduction in stiffness avoids objectionable resonance effects in the wheel and brake system. Also, the reduction or elimination of noise apparently follows, at least to a certain extent, from the fact that the forces due to impacts on the brake blocks, resulting from possible slight deformation of the drum surface due to heat and in some cases other irregularities on the same, are reduced by a properly yieldable condition of the expander tube.

Good results have been obtained by suitably reducing the stiffness of the surface 22 of the expander tube 19, which is in direct contact with the brake blocks. The non-sliding surface of contact between the expander tube 19 and the brake blocks 18, 18 is capable of treatment to the end of eliminating noise in the assembly despite the fact that the noise-producing friction surfaces are at the sliding contact of the blocks 18, 18 and the drum 17.

Material used in the expander tube 19, or at least the material in the surface area thereof, required for yieldability and resilience and at the same time structural strength and rigidity, is desirably of rubber or other rubber-like material of sufficient stiffness to press the blocks 18, 18 firmly against the drum 17 in effective braking contact, and of good heat-resistant properties. Synthetic rubber-like materials, such for example as neoprene Kogene, and Ameripol, have been found to be well suited to the purpose.

The desired results may be obtained by breaking the continuity of the surface 22, despite the fact that this is not a sliding surface, to obtain the desired yieldability and to obtain adequate avoidance or elimination of squeal, while retaining structural strength and stability.

A desired reduction in the stiffness of the expander tube surface 22, providing effective elimination of squeal, may be obtained by molding or otherwise suitably forming the same with depressions in the surface portion, as indicated in the drawing. With portions of the expander tube surface 22 open to a degree not excessive, the surface areas remaining may be provided of sufficient strength and stability of support to move the brake blocks 18, 18 firmly against the brake drum 17 while avoiding the possibility of permanent deformation or excessive temporary distortion of the expander tube 19, and at the same time, reduction of surface stiffness of the expander tube 19, for noise prevention or elimination, is accomplished.

Reduction in stiffness is dependent upon the ratio of load area to bulge area, load area being the effective surface remaining to contact the brake blocks 18, 18 and bulge area being the total of the areas provided by the openings in the surface which are effective in permitting bulging or temporary, localized deformation of portions of the rubber-like material supporting the surface area 22. Such bulging occurs in the lateral direction, in the sidewall portions of the grooves or depressions, but bulging may occur also in the bottom surfaces of such grooves or depressions.

The ability of the material of the tube surface at or near the face thereof to yield by bulging is related to the ratio of the area of the load-transmission surfaces to the area of the surfaces capable of bulging, i. e., the ratio of the area in contact with the brake blocks to the area not in contact with the blocks but in such proximity as to be distorted under the braking pressure. For best results this ratio ordinarily should not exceed about three to one, although larger ratios may be used with softer materials. In the case of brakes of a size suitable for commercial airline use good results have been obtained with a ratio of load area to bulge area of approximately unity. Inasmuch as the sidewalls of each depression in the tube surface contribute to the total bulge area, it has been found that the desired results may be obtained in many cases by reduction of approximately thirty percent of the gross outer peripheral tube surface, although this percentage may be varied considerably, so long as adequate contacting surface remains to provide adequate stability of the material under the braking force while the anti-noise function is achieved.

An expander tube constructed in accordance with the invention which has given good results is shown in Fig. 2. Portions of the surface 30 are here cut away in a plurality of discrete depressions 31, 31 leaving material surrounding each opening. The depressions are of a depth such as to allow for a sufficiently thick layer of the material of the expander tube between reinforcing plies 32, 32 and the bottom surfaces of the depressions 31. The reinforcing plies 32, 32 are desirable to ensure substantial retention of the shape of the expander tube 19 and to supplement the material of the surface 30 in maintaining the surface substantially flat across its width. The reinforcement may be provided by incorporating fabric, cords or other suitable reinforcement material in the resilient rubber-like material of the tube.

The expander tube may be recessed as indicated at 37 in its interior, at the connection of the stem 23, to ensure unimpeded drainage of fluid from passage 38 so that the possibility is avoided of pocketing of the fluid in the passage 38 during drainage.

Modified forms of the expander tube are shown in Figs. 3, 4, and 5. Continuous grooves 33, 33 in Fig. 3, lateral grooves 34, 34 in Fig. 4, holes 35, 35 in Fig. 5 and other suitable patterns, as for example, cup-shaped depressions, oblique grooves and the like may be used to obtain the relief of the surface. It has been found that an expander tube formed with the "waffle" pattern Fig. 2 or the continuous grooves of Fig. 3 has been very effective in eliminating objectionable squeal. The lateral grooves 34, 34 in Fig. 4 have the advantage of providing reduction in undesirable heating in the contact area by providing ventilating passages from the margins to the central portions of the same. A removable surface portion 36, with depressions therein, as for example the holes 35, 35 as shown in Fig. 5, may be provided for economy and convenience of replacement and is adapted to be simply positioned on the body portion of the expander tube, as indicated in the drawing, or adhered or otherwise secured thereto.

A further advantage of an expander tube constructed with depressions or grooves in the surface is that the volume increase under swelling from the action of oil is reduced by the less rigid surface provided.

Optionally, depressions or grooves may be provided in the underneath surfaces of the brake blocks 40, as shown at 41 in the embodiment of Fig. 6, to obtain the results desired, such relief of the surface of the brake blocks being provided either in lieu of or as an adjunct to the relief of the surface of the tube. With this expedient a reduction in rigidity of contact, a lowering of the resonant frequency and an elimination of noise may be accomplished by the ability of the tube wall to bulge in such depressions in the brake block.

In some cases the relief or yieldability for effectively avoiding noise may be provided in a surface of the expansible tube other than the surface of the tube contacting the brake block, as shown at 50, 50 in Fig. 7, or even in the surface of the supporting structure adjacent the tube, as shown at 51 in Fig. 8, to effect yieldability by localized bulging of the tube. While it is preferred to provide the relief at a surface of the expansible tube, either in the tube itself or in the structure adjacent the tube, the relief for yieldability may in some cases be provided in the material of the tube beneath its surface, as by providing an internally cellular construction 53 of the tube wall, as shown in Fig. 9.

Features of the invention may be applied advantageously to brakes of other than the expander tube type and also to clutches or the mechanism for effecting the frictional engagement of relatively rotatable members.

Variations may be made without departing from the scope of the invention as it is defined by the following claims.

I claim:

1. An expansible tube for pressing an intervening annular structure of a braking mechanism into frictional engagement with an annular surface, which annular structure and annular surface are capable of relative sliding movement one with respect to the other to effect braking, said expansible tube comprising an annular body portion, a fluid-receiving passage within said body portion, a surface portion of resilient rubber-like material integral with the body portion for contacting the annular structure to effect such pressing, the contacting surface portion being provided with a plurality of discrete depressions spaced-apart circumferentially and transversely of the tube to provide spaces for accommodating distortion of the rubber-like material to promote yieldability in said surface portion for avoiding the development of objectionable sound in effecting said frictional engagement, and means for conducting pressure-fluid to the fluid-receiving passage in the expansible tube for expanding the same.

2. A brake mechanism wherein an expansible element comprising resilient rubber-like material is mounted on a supporting element to press an intervening braking element into sliding engagement with a braking surface, characterized by the fact that at least one of said elements is relieved by circumferentially discontinuous depressions in portions other than the surfaces in sliding engagement to provide space for accommodating distortion therein of the rubber-like material of said expansible element to promote yieldability in the same for avoiding objectionable sound in effecting said sliding engagement of said braking element with said braking surface.

3. A brake mechanism wherein an expansible element comprising resilient rubber-like material is mounted to press an intervening braking element into sliding engagement with a braking surface, characterized by the fact that at least one of said elements at the surface thereof which is pressed against the other of said elements is relieved by circumferentially discontinuous depressions to provide space for accommodating distortion therein of the rubber-like material of said expansible element to promote yieldability in the same for avoiding objectionable sound in effecting said sliding engagement of said braking element with said braking surface.

4. A brake mechanism wherein an expansible element is mounted to press an intervening braking element into sliding engagement with a braking surface and has a portion of resilient rubber-like material in contact with said braking element, characterized by the fact that said portion of rubber-like material that contacts said intervening braking element comprises a plurality of longitudinally and transversely spaced-apart depressions in the face of said portion distributed throughout the major part of the length and width of the area thereof to provide voids for accommodating distortion of said rubber-like material to promote yieldability thereof for avoiding the development of objectionable sound in effecting said sliding engagement.

5. A brake mechanism wherein an expansible element is mounted to press an intervening braking element into sliding engagement with a braking surface and has a portion of resilient rubber-like material in contact with said braking element, characterized by the fact that said portion of rubber-like material that contacts said intervening braking element comprises a plurality of longitudinally and transversely spaced-apart depressions in the face of said portion distributed throughout the major part of the length and width of the area thereof to provide voids for accommodating distortion of said rubber-like material and the walls of said depressions provide bulge area more than one-third of the contacting area of said face to promote yieldability of said rubber-like material for avoiding the development of objectionable sound in effecting said sliding engagement.

6. A brake mechanism wherein an expansible element comprising resilient rubber-like material is mounted to press an intervening braking element into sliding engagement with a braking surface, characterized by the fact that the face of said expansible element that contacts said braking element is provided with a plurality of discrete depressions in waffle-like formation to provide voids for accommodating distortion of the rubber-like material and the walls of said depressions provide bulge area more than one-third the area of the contacting area of said face to promote yieldability in said face for avoiding the development of objectionable sound in effecting said sliding engagement.

ROBERT H. JUDSON.